WILLIAM W. SPEER.

Improvement in Potato Diggers.

No. 123,846.  Patented Feb. 20, 1872.

Witnesses:
A. W. Almqvist
Geo. W. Mabee

Inventor:
W. W. Speer
per
Attorneys.

123,846

UNITED STATES PATENT OFFICE.

WILLIAM W. SPEER, OF PITTSBURG, PENNSYLVANIA.

IMPROVEMENT IN POTATO-DIGGERS.

Specification forming part of Letters Patent No. 123,846, dated February 20, 1872.

Specification describing a new and useful Improvement in Potato-Digger, invented by WILLIAM W. SPEER, of Pittsburg, in the county of Allegheny and State of Pennsylvania.

Figure 1:
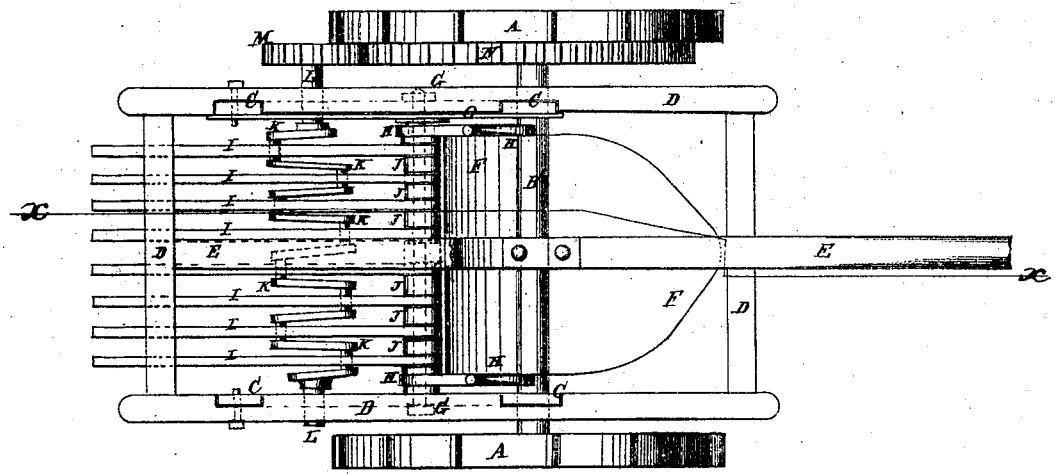
Figure 2:
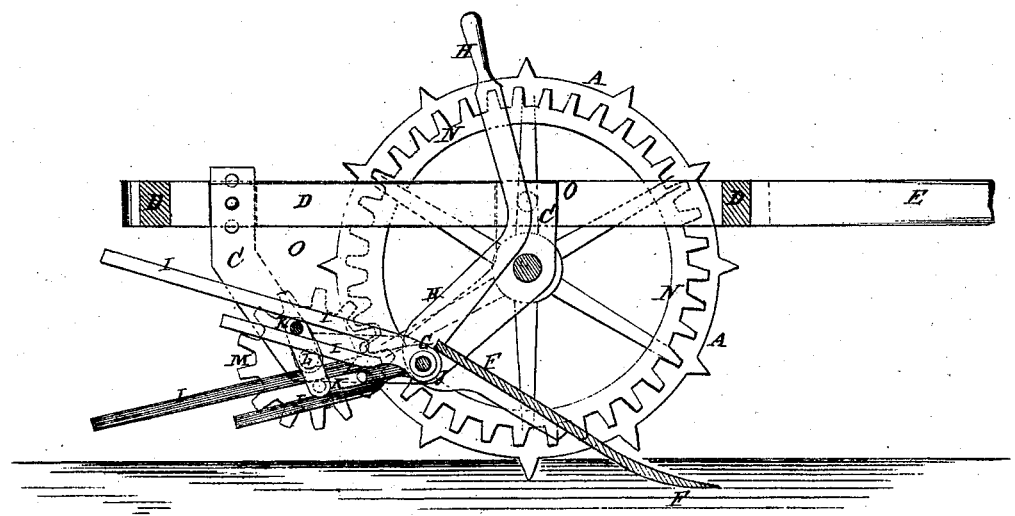

Figure 1 is a top view of my improved potato-digger, the driver's seat being removed. Fig. 2 is a detail longitudinal vertical section of the same taken through the line $x$ $x$, Fig. 1.

My invention has for its object to furnish an improved machine for digging potatoes and separating them from the soil with which they are raised, and which shall be simple in construction and effective and reliable in use; and it consists in the construction and combination of various parts of the machine, as hereinafter more fully described.

A are the drive-wheels, which are so connected with the axle B, upon which they are placed, as to carry the said axle with them in their revolution when the machine is drawn forward. The axle B revolves in bearings in the forward arms of the bent bars C, the forward ends of which are attached to the frame D, to which the tongue E is firmly attached. F is the shovel or lifter, the rear end of which is firmly connected with the shaft G by means of lugs formed upon or attached to the lower side of the rear end of the said shovel F, and through which the said shaft G passes. The ends of the shaft G are secured to the lower part of bent bars C. The rear ends of the bent bars C are secured to the rear part of the frame D by pins or bolts, several holes being formed in the said bars to receive the said pins or bolts, so that the position of the said bars may be conveniently adjusted to adjust the pitch of the shovel F and of the separator, as may be required. H are two levers, the lower ends of which are firmly secured to the rear end of the shovel F. The levers H incline upward and forward, as shown in Figs. 1 and 2, so as to rest against the axle B, and thus support the downward pressure upon the shovel F. The upper parts of the levers H incline upward and rearward, so that they may be conveniently reached and operated by the driver from his seat to raise the shovel from the ground when required. I are the arms of the separator, the forward ends of which are strung upon the shaft G and kept at such a distance apart that the potatoes cannot pass between them by washers J placed upon the shaft G between the said arms I. The arms I are made forked, the lower branch being made the shorter, as shown in Fig. 2, to form slots to receive the cranks K formed upon the shaft L. The cranks K are formed alternately upon the opposite sides of the said shaft, as shown in Figs. 1 and 2, so that the alternate arms I may be raised and lowered alternately to shake off any soil that may adhere to the potatoes. To one end of the crank-shaft K L is attached a small gear-wheel, M, the teeth of which mesh into the teeth of the gear-wheel N, attached to or formed upon the inner side of one of the drive-wheels A so that the crank-shaft K L may be revolved to agitate the arms I by the advance of the machine. By this construction, as the machine is drawn forward the potatoes and the soil in which they are embedded pass up the shovel F to the arms I, where they are separated, the soil passing between said arms I to the ground, and the potatoes dropping to the ground at the rear ends of the arms I, the potatoes being thus left upon the surface of the ground ready to be gathered. I do not, however, claim the mode of operating the arms by means of a crank-shaft. To the bent bar C, at the side of the machine at which the gear-wheels M N are placed, is attached a plate, O, to keep the vines and other rubbish from coming in contact with and clogging the said gear-wheels M N, and thus impeding their proper operation.

By omitting the shovel F and levers H, the machine may be attached to a single-shovel cultivator, at the rear of the shovel.

Having thus described my invention, I claim as new and desire to secure by Letters Patent—

1. The arms I, pivoted or hinged to the shaft G, and bifurcated or slotted to receive the cranks K of the shaft L, as shown and described.

2. The adjustable bent bars C, in combination with the frame D, crank-shaft K L, slotted arms I, shaft G, shovel F, and axle B, substantially as shown and described, and for the purpose set forth.

WILLIAM W. SPEER.

Witnesses:
MINOT HOLMES,
ALBERT TOMLINSON.